United States Patent
Kawai et al.

(10) Patent No.: US 9,737,086 B2
(45) Date of Patent: Aug. 22, 2017

(54) OIL— OR FAT-PROCESSED STARCH AND METHOD FOR PRODUCING SAME

(75) Inventors: Shogo Kawai, Tokyo (JP); Isao Kobayashi, Tokyo (JP); Masaru Goto, Tokyo (JP)

(73) Assignee: J-OIL MILLS, INC., Tokyo (JP)

( * ) Notice: Subject to any disclaimer, the term of this patent is extended or adjusted under 35 U.S.C. 154(b) by 225 days.

(21) Appl. No.: 14/122,402

(22) PCT Filed: Apr. 3, 2012

(86) PCT No.: PCT/JP2012/002303
§ 371 (c)(1),
(2), (4) Date: Nov. 26, 2013

(87) PCT Pub. No.: WO2012/164801
PCT Pub. Date: Dec. 6, 2012

(65) Prior Publication Data
US 2014/0087052 A1    Mar. 27, 2014

(30) Foreign Application Priority Data

Jun. 1, 2011  (JP) ................................. 2011-123513

(51) Int. Cl.
| | | |
|---|---|---|
| *A23L 1/0522* | (2006.01) | |
| *A21D 2/18* | (2006.01) | |
| *A23L 29/219* | (2016.01) | |
| *A23L 13/40* | (2016.01) | |
| *A23L 13/50* | (2016.01) | |
| *A23L 13/60* | (2016.01) | |
| *A23L 17/00* | (2016.01) | |
| *A23L 29/212* | (2016.01) | |

(52) U.S. Cl.
CPC ............ *A23L 1/0522* (2013.01); *A21D 2/186* (2013.01); *A23L 13/42* (2016.08); *A23L 13/422* (2016.08); *A23L 13/426* (2016.08); *A23L 13/43* (2016.08); *A23L 13/52* (2016.08); *A23L 13/65* (2016.08); *A23L 13/67* (2016.08); *A23L 17/65* (2016.08); *A23L 17/70* (2016.08); *A23L 29/219* (2016.08); *A23L 29/212* (2016.08)

(58) Field of Classification Search
CPC ...... A23L 1/0522; A23L 2/52; A23L 1/05223; A23L 1/307; A23L 1/05; A23L 29/212; A23L 29/219; A23L 13/42; A23L 13/426; A23L 13/65; A21D 2/186
USPC ....................................................... 426/578
See application file for complete search history.

(56) References Cited

U.S. PATENT DOCUMENTS

2006/0286251 A1* 12/2006 Woo et al. .................... 426/578

FOREIGN PATENT DOCUMENTS

| JP | 45-32898 | 10/1970 |
|---|---|---|
| JP | 54-11247 | 1/1979 |
| JP | 5931672 | 2/1984 |
| JP | 4-51854 | 2/1992 |
| JP | 6-133714 | 5/1994 |
| JP | 2000-342210 | 12/2000 |
| JP | 2005-73506 | 3/2005 |
| JP | 2005-318871 | 11/2005 |
| JP | 4838390 | 12/2011 |
| JP | 2012-165724 | 9/2012 |
| WO | 2006133335 A2 | 12/2006 |

OTHER PUBLICATIONS

Seguchi, M; Oil Binding Ability of Chlorinated and Heat Wheat Starch Granules and Their Use in Breadmaking and Pancake Baking; XP002403836; Starch/StSrke (53); Sep. 2001; pp. 408-413.*
Seguchi, M., et al.; Oil-binding Ability of Heat-treated Wheat Starch; Jan. 1984; Cereal Chem. 61(3) 248-250.*
International Search Report dated May 1, 2012 filed in PCT/JP2012/002303.
Chinese Office Action dated Aug. 6, 2014 issued in the corresponding Chinese patent application No. 201280026899.3.
Communication from European Patent Office dated Nov. 10, 2014 issued in the corresponding European patent application No. 12792065.0.
Okuda, Akune., "Reproducibility Test of EP Application No. 12792065.0 "Fat and Oil processed starch and production method thereof" using Examples of U.S. Pat. No. 4,838,390 "Batter for deep-fried food"," Nihon Shokuhin Kako Co., Ltd Research Institute, Apr. 17, 2014, total 3 pages.; Cited in Communication from European Patent Office.
Extended European Search Report dated Jan. 15, 2015 issued in the corresponding European patent application No. 12792065.0.
Seguchi, Masaharu., "Oil binding ability of chlorinated and heated wheat starch granules and their use in breadmaking and pancake baking," Starch/Starke, vol. 53, 2001, pp. 408-413.; Cited in Extended European Search Report.

* cited by examiner

*Primary Examiner* — Jyoti Chawla
(74) *Attorney, Agent, or Firm* — Rankin, Hill & Clark LLP

(57) ABSTRACT

An oil- or fat-processed starch, exhibiting a solubility of equal to or higher than 9.5% by mass and equal to or lower than 45% by mass, and an emulsifying capacity of equal to or higher than 50% and equal to or lower than 100%.

8 Claims, No Drawings

OIL—OR FAT-PROCESSED STARCH AND METHOD FOR PRODUCING SAME

TECHNICAL FIELD

The present invention related to an oil- or fat-processed starch and a method for producing thereof.

BACKGROUND ART

Conventionally, animal proteins, vegetable proteins, starches and so forth have been employed in the manufacturing process for processed products of edible meats such as processed products of animal meats such as hamburg steaks, meatballs, shao-mai (shumai), dumplings and the like, or seafood processed products such as steamed fish pastes (kamaboko), fried fish pastes (age-kamaboko), steamed whipped fish pastes (hanpen), tubular fish meat (chikuwa), fish meat sausage and the like, for the purpose of depressing bouillon (drip) during heating, improving eating-texture and enhancing production yield.

In particular, egg white powder as animal proteins and powder soya bean protein, powder wheat protein and the like as vegetable proteins provide springy eating-texture and enhanced effects for preventing drip, and thus are generally employed.

However, these proteins contain their own unique flavor, which requires adding spices and seasonings in order to mask the flavor, causing a problem of reducing the original deliciousness of the edible meat. Also, these proteins are the allergen for food allergy, and thus it is required to label the use of such protein in the use thereof in recent years.

On the other hand, starches exhibit advantages of relative lower price, lower smells causing no allergy and the like, and thus are broadly utilized for enhancing the production yield of the edible meat products. However, an addition of an excess amount of the starch to the edible meat-processed product for obtaining higher improvement effect for the production yield adversely causes stickier eating-texture or soft eating-texture that is unique to the starches, possibly deteriorating springy and juicy eating-texture of the edible meat-processed products. For this reason, it is eagerly expected to present a new type of a starch, which can be added in the edible meat-processed products and can exhibit enhanced effect for preventing the drip during the heating without deteriorating the springiness and the juicy feel of the edible meat.

Meanwhile, the oil- or fat-processed starch is a starch obtainable by drying or heating a mixture after the preparation of such mixture by mixing a starch with an oil, a fat or an oil- or fat-related substance, and have been utilized through the ages for the purpose of improving the springiness of the seafood fish pastes, improving the productions yield of the edible meat-processed products and improving the eating-texture (Patent Documents 1 and 2).

Patent Document 1 (Japanese Patent Pre-Grant Publication No. S45-32,898 (1970)) describes a method for producing an oil- or fat-processed starch, in which an oil or fat is adsorbed to starch grains by contacting thereof, and after drying, is aged by presenting a heat source of 30 degrees C. to 150 degrees C. Patent Document 2 (Japanese Patent Laid-Open No. S54-11,247 (1979)) describes a method for producing an oil- or fat-processed starch by adding an oil or fat having iodine value of equal to or higher than 130 (equal to or higher than 125 for soya bean oil) to a starch at a ratio of 0.005 to 10% wt.

RELATED DOCUMENTS

Patent Documents

[Patent Document 1] Japanese Patent Pre-Grant Publication No. S45-32,898 (1970)
[Patent Document 2] Japanese Laid-Open Patent Application Publication No. S54-11,247 (1979)
[Patent Document 3] Japanese Laid-Open Patent Application Publication No. H04-51,854 (1992)
[Patent Document 4] Japanese Laid-open patent Application publication No. H06-133,714 (1994)
[Patent Document 5] Japanese Laid-Open Patent Application Publication No. 2005-73,506

SUMMARY OF INVENTION

Problems to be Solved by Invention

Since the technology described in the above-described Patent Document 1 includes a heating process at high temperature in the production of the oil- or fat-processed starch, the use of the oil- or fat-processed starch as improving agents for the edible meat-processed product results in the inclusion of the oil or fat in the improving agent which has been experienced the heating process at higher temperature. In particular, even in the case that the oil or fat has higher iodine value and thus is easy to be oxidized, such oil or fat is heated to an elevated temperature in the production of the oil- or fat-processed starch.

However, when the oil or fat having higher iodine value is heated, oxidation of the oil or fat is progressed. Then, a smell unique to the oxidation of oil or fat is generated, which deteriorates the flavor and the eating-quality of the edible meat-processed product containing this smell knead therein, resulting in possibly deteriorating the value of the product.

Further, it is clarified according to the study of the present inventors that the oxide of the oil or fat generated in the heating partially decomposes the starch to increase the solubility of the starch, resulting in the reduction of the water retentivity.

Meanwhile, available technologies for improving the production yield of the starch may include a technique for adding an alkali salt in the edible meat-processed product to improve the production yield or the eating-texture, or a technique for employing the starch jointly with the alkali salt in the edible meat-processed product, and these techniques cannot provide sufficient improvement in the production yield and in the eating-texture.

Also, Patent Document 3 (Japanese Laid-Open Patent Publication No. H04-51,854 (1992)) and Patent Document 4 (Japanese Laid-Open Patent Publication No. H06-133,714 (1994)) describe a method for producing processed starches, in which raw materials of starches, alkali salts and raw soy bean powder are mixed, and the mixture is thermally processed at equal to or higher than 120 degrees C. Since the raw soy bean powder is employed in these production methods, a flavor unique to the soy bean is generated. Also, since the batter applications such as Tempura, deep-fried food or the like, which are the main purpose of Patent Documents 3 and 4, are cooked in an oil at higher temperature, such flavor unique to the soy bean volatilizes to possibly avoid causing a serious problem in the eating, and on the other hand, when the processed starch is blended in the edible meat-processed product that requires relatively lower heating temperature, such flavor unique to the soy bean may possibly spoil the original flavor of the meat. Also, such processed starch is thermally treated at relatively higher temperature of 120 degrees C., which increases the flavor unique to the soy bean and further partially damage the starch to increase the solubility, and thus when such processed starch is blended in the edible meat processed product, a deterioration of the function is predicted.

As described above, there is no known technology related to an oil- or fat-processed starch, which has an effect for improving the edible meat that can be an alternative to a protein that has been conventionally employed as an eating-texture improver agent for the edible meat processed products, and also has an effect for improving the production yield that is unique to the starch, and further exhibits smallest the flavors and the abnormal flavors that are unique to the oil or fat and the protein.

Means for Solving Problems

The present inventors have eagerly conducted a study in order to solve the above-described problem, and have eventually found that an oil- or fat-processed starch having a specific solubility and an emulsifying capacity exhibits enhanced quality with excellent flavor and also exhibits blended in the foods such as the edible meat-processed products enhanced effect for improving the eating-texture and enhanced effect for improving the production yield.

More specifically, according to the present invention, there is provided an oil- or fat-processed starch, satisfying the following conditions (A) and (B):
(A) a solubility is equal to or higher than 9.5% by mass and equal to or lower than 45% by mass, said solubility being obtained by the following procedure: 0.1 g by anhydride conversion of the oil- or fat-processed starch is dispersed in 10 mL of distilled water, and the mixture is heated in a thermostatic bath vessel at 90 degrees C. for 30 minutes, and then is cooled down to 20 degrees C. to obtain a gelatinized liquid; the gelatinized liquid is centrifuged to be separated; and total sugar content contained in a supernatant liquid is measured by a phenol-sulfuric acid method to obtain said solubility; and
(B) an emulsifying capacity is equal to or higher than 50% and equal to or lower than 100%, said emulsifying capacity being obtained by the following procedure: 2.5 g of the oil- or fat-processed starch is dispersed in 30 g of distilled water and 30 g of canola oil is added therein and the mixture is stirred (at 3,000 rpm for 1 minute) by a homogenizer; and then, promptly after the stirring, 50 mL of the dispersion is transferred in a measuring cylinder of a volume of 50 mL and is left for 30 minutes, and a volume fraction of an emulsified layer is measured to obtain said emulsifying capacity.

According to another aspect of the present invention, there is provided a food improving agent, containing the above-described oil- or fat-processed starch of the present invention.

According to further aspect of the present invention, there is provided a food, containing the above-described food improving agent of the present invention.

According to yet other aspect of the present invention, there is provided a method for producing the above-described oil- or fat-processed starch, including: preparing a mixture by blending an edible oil or fat and/or an edible oil- or fat-related substance at an amount of equal to or larger than 0.005 parts by mass and equal to or smaller than 2 parts by mass in 100 parts by mass of the raw starch; and heat-treating said mixture.

In addition to above, any arbitrary combination of each of these constitutions or conversions between the categories of the invention such as a process, a device, a method for utilizing the device and the like may also be within the scope of the present invention.

For example, a method for improving a food including adding the aforementioned food improving agent according to the present invention at equal to or higher than 1% by mass and equal to or lower than 30% by mass over a foodstuff, preferably at equal to or higher than 1% by mass and equal to or lower than 25% by mass, and further preferably at equal to or higher than 1% by mass and equal to or lower than 20% by mass, may be incorporated in the present invention.

In addition, a method for improving an edible meat including adding the aforementioned edible meat improving agent according to the present invention at equal to or higher than 1% by mass and equal to or lower than 20% by mass may also be incorporated in the present invention.

Advantageous Effects of Invention

As described above, according to the present invention, the oil- or fat-processed starch, which exhibits enhanced quality with excellent flavor and also exhibits blended in the foods such as the edible meat-processed products enhanced effect for improving the eating-texture and enhanced effect for improving the production yield can be obtained.

DESCRIPTION OF EMBODIMENTS

In the present invention, the oil- or fat-processed starch refers to a starchiness material, which is produced through a production process having steps, in which an edible oil or fat, or an edible oil- or fat-related substance is added in a raw starch and then the mixture is mixed and heated.

The oil- or fat-processed starch of the present invention exhibits a solubility measured according to a method as described later of equal to or higher than 9.5% by mass and equal to or lower than 45% by mass, and an emulsifying capacity of equal to or higher than 50% and equal to or lower than 100%. Since the oil- or fat-processed starch of the present invention is configured that the both of the solubility and the emulsifying capacity are satisfied with the above-described specific conditions, the oil- or fat-processed starch can be blended in the edible meat-processed products and the like to effectively suppress a generation of a drip of the food while improving the eating-texture of the food, thereby achieving improved production yield of the food.

Meanwhile, in the present specification, the solubility of the oil- or fat-processed starch is specifically measured by the following method.

First of all, 0.1 g by anhydride conversion of a sample (oil- or fat-processed starch) is dispersed in 10 mL of distilled water, and the obtained dispersion is heated in a thermostatic bath at 90 degrees C. for 30 minutes, and then is cooled down to 20 degrees C. Then, the obtained gelatinized liquid is centrifuged (3,000 rpm, 10 minutes) by employing a centrifugal separator, and the total sugar content contained in a supernatant liquid is measured by phenol-sulfuric acid method.
More specifically:

$$[\text{solubility (\%)}] = [\text{total sugar content in supernatant liquid (g)}]/[0.1\text{ (g)}] \times 100.$$

In the present invention, the solubility of oil- or fat-processed starch is equal to or lower than 45% by mass, in view of the eating-texture of the product, and in particular, in view of the flexibility of the edible meat, and preferably equal to or lower than 40% by mass, and more preferably equal to or lower than 35% by mass.

On the other hand, in view of providing improved dispersibility of the oil- or fat-processed starch, the solubility of oil- or fat-processed starch is, for example, equal to or higher than 9.5% by mass, and preferably equal to or higher than 10% by mass.

Also, in the present specification, the emulsifying capacity of the oil- or fat-processed starch is specifically measured by the following method.

Specifically, 2.5 g of a sample (oil- or fat-processed starch) is dispersed in 30 g of distilled water, and 30 g of canola oil is added therein, and the dispersion is stirred with a homogenizer (3,000 rpm, 1 minute), and then, promptly after the stirring, 50 mL of the stirred dispersion is transferred in a measuring cylinder of a volume of 50 mL. After leaving the dispersion standing still for 30 minutes, volume of an emulsified layer is read out according to the graduation of the measuring cylinder, and the obtained value is defined as an indicator of the emulsifying capacity.

Therefore, the emulsifying capacity is a volume fraction of the emulsified layer, and thus:

[emulsifying capacity (%)]=[volume of emulsified layer (mL)]/[50 (mL)]×100.

In addition to above, the temperature for measuring the emulsifying capacity is, for example, a room temperature (25 degrees C.).

The emulsifying capacity of the oil- or fat-processed starch according to the present invention is equal to or higher than 50% in view of stably improving the eating-texture, and preferably equal to or higher than 55%, and more preferably equal to or higher than 60%. Also, there is no particular upper limit of the emulsifying capacity of the oil- or fat-processed starch, and thus is equal to or lower than 100%, and for example, may be equal to or less than 95%.

Next, the method for producing the oil- or fat-processed starch according to the present invention will be described. The method for producing the oil- or fat-processed starch according to the present invention includes, for example, the following process steps:
(first step) a step for preparing a mixture by blending an edible oil or fat and/or an edible oil- or fat-related substance in a raw starch; and
(second step) a step for heat-treating the mixture obtained in the first step.

Meanwhile, it has been difficult to obtain the oil- or fat-processed starch having characteristics of predetermined solubility and emulsifying capacity in the present invention by simply employing the conventional method for producing the oil- or fat-processed starch. Then, it is found that, as will be described later in Examples, the pH adjuster, as well as the edible oil or fat and the starch, is blended to prepare the mixture in the above-described first step, and the edible oil or fat, the starch and the pH adjuster are heated in the predetermined conditions to allow the production of the oil- or fat-processed starch having predetermined solubility and emulsifying capacity.

The raw materials and conditions employed in the first and the second steps will be further specifically described below.

Typical raw starches include, more specifically, corn starch, waxy corn starch, high amylose corn starch, potato starch, tapioca starch, wheat starch, rice starch, sago starch, sweet potato starch and modified starches thereof such as, for example, each of acetylated, etherified, cross-linked starches alone or a combination thereof.

Also, in view of the stabilization of the eating-texture, the raw starch having the degree of swelling of equal to or lower than 45, preferably equal to or lower than 40, and more preferably equal to or lower than 20, may be employed. In addition to above, while there is no particular limitation in the lower limit of the degree of swelling of the raw starch, the degree of swelling may be, for example, equal to or higher than 5, in view of improving the eating-texture.

Here, the degree of swelling may be obtainable by the following method. Specifically, 1 g of the raw starch is dispersed in 100 mL of water, and is heated at 80 degrees C. in a thermostatic chamber for 30 minutes, and then is cooled down to 30 degrees C., and then is centrifuged (3,000 rpm, 10 minutes). A portion of the obtained precipitation is taken, and is thermally dried (105 degrees C., 4 hours), and the weights before and after the thermal dry are measured. The degree of swelling is obtainable as a ratio of the weight before dry over the weight after dry of precipitation (weight before dry/weight after dry).

The above-described starch having lower degree of swelling may be selected from, for example, the cross-linked starch, the acetylated starch, the potato starch, the corn starch and the waxy corn starch, and the cross-linked starch, the acetylated starch and the potato starch are preferable.

Typical edible oil or fat includes soya bean oil, safflower oil such as high linoleic safflower oil and the like, corn oil, canola oil, perilla oil, flaxseed oil, sunflower oil, peanut oil, cotton seed oil, olive oil, rice oil, palm oil and the like.

Also, typical edible oil- or fat-related substance includes: emulsifying agents such as glycerol fatty acid esters and the like; phospholipids; glycerides such as monoglyceride, diglyceride and the like.

Also, it is more preferable to employ the oil or fat having iodine value of equal to or higher than 100 as the edible oil or fat, and it is further preferable to employ that having iodine value of equal to or larger than 140. Such oil or fat having higher iodine value is susceptible to oxidation by the heating, exhibits higher reforming effect of the starch, and thus the effect for improving the eating-texture of the food such as the edible meat-processed products can be expected. Typical oil or fat having iodine value of equal to or larger than 140 includes, specifically, high linoleic safflower oil, flaxseed oil and the like.

Meanwhile, the blending ratio of the edible oil or fat and/or the edible oil- or fat-related substance in the mixture is, for example, equal to or higher than 0.005% by mass over 100 parts by mass of the raw starch, in view of firmly obtaining the effect for reforming the starch, and preferably equal to or higher than 0.008 parts by mass, and more preferably equal to or higher than 0.02 parts by mass. On the other hand, the blending ratio of the edible oil or fat and/or the edible oil- or fat-related substance in the mixture is, for example, equal to or lower than 2% by mass, in view of the effect for improving the eating-texture, and preferably equal to or lower than 1.5 parts by mass, and more preferably equal to or lower than 0.8 parts by mass.

Also, a specific example of a combination of the starch and the edible oil or fat employed in the production of the oil- or fat-processed starch includes, for example, a combination of the cross-linked starch and the oil or fat having iodine value of equal to or larger than 100. This allows to more stably obtaining the oil- or fat-processed starch having specific solubility and emulsifying capacity and improved flavor.

Also, the pH adjuster available here may be the pH adjuster that can be utilized for the foods, and may be suitably selected according to the types of the raw starch and the edible oil or fat, and in view of the solubility in water and the influence to the taste of the final product, the preferable pH adjuster includes: hydroxides such as sodium hydroxide, potassium hydroxide, calcium hydroxide, magnesium hydroxide and the like; carbonates such as sodium carbonate, sodium hydrogen carbonate, potassium carbonate and the like; phosphates such as disodium hydrogen phosphate, sodium dihydrogen phosphate and the like; and other types of organic acid salts except the above-described compounds such as trisodium citrate, sodium acetate, sodium lactate, disodium succinate, sodium gluconate, sodium tartrate, monosodium fumarate and the like, and it is preferable to blend one or more of these compounds. It is further preferable to employ one of more of carbonates such as sodium carbonate, sodium hydrogen carbonate, potassium carbonate and the like.

Also, in view of further effectively suppressing oxidation odor of the oil- or fat-processed starch, it is preferable to employ the pH adjuster, 1% by mass aqueous solution (25 degrees) of which exhibits pH of equal to or higher than 6.5, and more preferably equal to or higher than 8.0, and further preferably equal to or higher than 10.

The adding quantity of the pH adjuster over 100 parts by mass of the starch is, for example, within the range of equal to or larger than 0.005 parts by mass and equal to or smaller than 2 parts by mass, preferably equal to or larger than 0.02 parts by mass and equal to or smaller than 1.5 parts by mass, more preferably equal to or larger than 0.03 parts by mass and equal to or smaller than 1.2 parts by mass, and further more preferably equal to or larger than 0.03 parts by mass and equal to or smaller than 1 parts by mass. Excessively smaller adding quantity of the pH adjuster may cause a case, in which the oxidation odor of the oil- or fat-processed starch cannot be suppressed. This may further cause a case, in which decomposition of the starch by the oxidation of the oil or fat is caused to fails to obtain sufficient effect for improving the food of the edible meat processed product. On the other hand, excessively lager adding quantity of the pH adjuster may cause a case, in which a perceptible harsh taste unique to the pH adjuster is exhibited in the food such as the edible meat processed product containing the added pH adjuster.

Also, in view of stably controlling the solubility and the emulsifying capacity of the oil- or fat-processed starch, the adding quantity of the pH adjuster may be controlled so that pH of the mixture is, for example, around 6.5 to 10.9, and preferably around 6.5 to 10.5.

The pH value of the mixture is presented by the value of pH according to glass electrode method of slurry, which is prepared as starch slurry of 10% by mass concentration of the mixture obtained in the above-mentioned first step.

The pH adjuster is added in the first step, which more specifically involves mixing the starch and the oil or fat. There is no particular limitation in the method for adding the pH adjuster, and a salt may be added as it is, and preferably the pH adjuster may be dissolved in advance in water of 1 to 10 times amount of the salt and then the obtained salt solution may be added. It is further preferable that the pH adjuster is dissolved in water of equal to or larger than 0.1 parts by mass and equal to or smaller than 10 parts by mass over 100 parts by mass and then the solution is added therein. The aqueous solution of the pH adjuster is prepared in advance to further stably suppress the damage to the starch by the heating, so that the solubility of the obtained oil- or fat-processed starch can be more stably controlled within predetermined range.

In addition to above, there is no particular limitation in the sequence of the addition of the pH adjuster in the first step, and the pH adjuster may be added after the raw starch is mixed with the edible oil or fat and/or the edible oil- or fat-related substance, or on the other hand, the edible oil or fat and/or the edible oil- or fat-related substance may be added after raw starch and the pH adjuster are added. Preferably, in view of the workability, it is preferable to add the pH adjuster after the raw starch and the edible oil or fat and/or the edible oil- or fat-related substance are mixed.

Next, the second step will be described.

In the second step, the mixture of the starch, the pH adjuster and the edible oil or fat and/or the edible oil- or fat-related substance are heated to obtain the oil- or fat-processed starch, which exhibits the effect for improving the quality of the solid or gelatinous food such as the edible meat and the like.

Concerning the thermal treatment, when it is heated and burned at a high temperature of, for example, equal to or higher than 150 degrees C., the viscosity of the starch is reduced by the damage of the starch granules, and thus there is the concern that the water retentivity that the starch originally has may be lost. Then, there is the concern for reducing the production yield when this is added to the edible meat-processed products. Thus, the thermal aging may be carried out preferably at a low temperature of equal to or lower than 130 degrees C., and more preferably lower than 120 degrees C., and more preferably at a lower temperature of around 40 to 110 degrees C. This can achieve suppressing the damage of the starch to provide more enhanced effect for improving quality of the edible meat. In addition to above, while there is no limitation in the lower limit of the heating temperature, in view of moderately reducing the aging time and providing improved productivity, it may be, for example, equal to or higher than 40 degrees C.

The term for the thermal aging may be suitably set according to the condition of the starch and the heating temperature, and for example, equal to or longer than 0.5 hour and equal to or shorter than 25 days, and preferably equal to or longer than 5 hours and equal to or shorter than 20 days, and more preferably equal to or longer than 6 hours and equal to or shorter than 18 days.

Meanwhile, slurry viscosity is generally employed for a guide for the aging term of the oil- or fat-processed starch. Although the reason for the increase in the slurry viscosity in the case of the oil- or fat-processed starch is not clear, it is considered that the oil or fat in the surface of the starch is oxidized and polymerized by the heating to cause the hydrophobic change of the starch surface, such that the oil- or fat-processed starch contains water and air to exhibit cream-like physical property. Our consideration is that this results in the increase of the viscosity of the slurry.

Meanwhile, it is described in Patent Document 5 (Japanese Laid-Open Patent Application Publication No. 2005-73,506) that the oil- or fat-processed starch employing the oil or fat having iodine value of equal to or higher than 130, which exhibits the 40% wt. concentration slurry viscosity of equal to or larger than 200 cP, is suitable for the batter application. On the other hand, as shown in Examples discussed later, an oil- or fat-processed starch of Comparative Example 5, which was produced in conditions equivalent to that employed in "Example 4" described in Patent Document 5, did not satisfy the solubility required in the present invention. Further, the slurry viscosity of the oil- or fat-processed starch of the present invention is relatively lower as compares with the oil- or fat-processed starch described in Patent Document 5. In the present invention, more specifically, the viscosity of the slurry of the concentration of the 40% by mass is lower than 150 cP, and preferably equal to or lower than 130 cP, which are measured by the following procedure: 108 g by anhydride conversion of a sample (oil- or fat-processed starch) is dispersed in ice cold water so as to adjust the total amount of 300 g; and the viscosity of the obtained dispersion is measured with a Brookfield viscometer under the condition that the rotor rotating speed is set at 60 rpm and the measurement is carried out after the rotor is rotated for 10 seconds.

The reason for achieving relatively lower viscosity of the slurry of the oil- or fat-processed starch obtained by the above-described production method is considered that the pH adjuster such as alkaline salt or the like is added in the first step to reduce the oxidizing rate of the oil or fat by the heating, which results in the reduction of the oxidation and the polymerization in the surface of the oil- or fat-processed starch to decrease hydrophobicity in the surface of the oil- or fat-processed starch, thereby decreasing the viscosity of the slurry of the oil- or fat-processed starch.

Also, in the above described production process, the solubility of the oil- or fat-processed starch can be adjusted by suitably controlling the amount of the pH adjuster. Also, the emulsifying capacity of the oil- or fat-processed starch can be adjusted by suitably controlling the amount of oil or fat. Therefore, the oil- or fat-processed starch having the solubility and the emulsifying capacity, which are within the specific ranges, can be produced by suitably adjusting the amount of the oil or fat and the amount of the pH adjuster according to the employed raw material in the first and the second steps.

According to the above-described procedure, the oil- or fat-processed starch according to the present invention is obtained.

The oil- or fat-processed starch thus obtained satisfies the specific conditions related to the solubility and the emulsifying capacity, and thus exhibits enhanced effect for improving the eating-texture and enhanced water retaining capacity. For this reason, a generation of a drip is suppressed, resulting in providing enhanced production stability and production yield. Also, it is not necessary to employ high temperature for conducting the heating in the second step, so that the oxidation odor of the oil or fat created by the heating can be reduced to obtain the food with improved flavor.

The oil- or fat-processed starch according to the present invention may be added to various types of foods. While there is no particular limitation to the type of the available foods, the processed starch may be employed in, for example, solid or gelled food substances such as the edible meat, the edible meat-processed products and the like, or in other food substances such as processed marine products, noodles, breads and the like to achieve effectively improved production yield. More specifically, the oil- or fat-processed starch according to the present invention may be employed as, for example, a food improving agent such as an edible meat improving agent and the like. Also, the food improving agent such as the edible meat improving agent according to the present invention contains the oil- or fat-processed starch according to the present invention. Also, the food according to the present invention contains the above-described food improving agent according to the present invention. For example, the edible meat processed product according to the present invention contains the above-described edible meat improving agent according to the present invention.

EXAMPLES

In the following Examples, the "parts" in the blending of the raw material means "parts by mass" and "%" means "% by mass" when no particular notice is made.

Also, sensory evaluations were conducted by five special panelists in the following Examples.

Example 1

0.1 part of High linoleic safflower edible oil and 0.4 part of 25% sodium carbonate aqueous solution, which was prepared by adding 30 parts of water to 10 parts of sodium carbonate to completely dissolve sodium carbonate (0.1 part as sodium carbonate equivalent), were added to 100 parts of tapioca cross-linking starch "TP-1" (commercially available from J-OIL MILLS, Inc.), and were uniformly mixed by employing a mixer (super mixer, commercially available from KAWATA Co., Ltd.) at 3,000 rpm for 3 minutes to obtain a mixture (water content: 14.8%). This mixture was heated with a tray-type drier at 70 degrees C. for 14 days to obtain an oil- or fat-processed starch (sample 1).

Comparative Example 1

0.1 part of high linoleic safflower edible oil was added to 100 parts of tapioca cross-linking starch "TP-1" (commercially available from J-OIL MILLS, Inc.), and was mixed and heated in the conditions pursuant to the method described in Example 1. The oil- or fat-processed starch (sample 2) was obtained without employing a pH adjuster in the preparation by this procedure.

Comparative Example 2

0.4 part of 25% sodium carbonate aqueous solution (0.1 part as sodium carbonate equivalent) was added to 100 parts of tapioca cross-linking starch "TP-1" (commercially available from J-OIL MILLS, Inc.), and was mixed and heated as in Example 1. The starch without containing an edible oil or fat (sample 3) was obtained by this procedure.

Comparative Example 3

0.1 part of sodium carbonate was added to 100 parts of the oil- or fat-processed starch obtained in Comparative Example 1, and was uniformly mixed by employing a mixer (super mixer, commercially available from KAWATA Co., Ltd.) at 3,000 rpm for 3 minutes. A mixture product of the pH adjuster and the oil- or fat-processed starch (sample 4) was obtained by this procedure.

Comparative Example 4

0.1 part of high linoleic safflower edible oil and 0.4 part of 25% sodium carbonate aqueous solution (0.1 part as sodium carbonate equivalent) were added to 100 parts of tapioca cross-linking starch "TP-1" (commercially available from J-OIL MILLS, Inc.), and were uniformly mixed by employing a mixer (super mixer, commercially available from KAWATA Co., Ltd.) at 3,000 rpm for 3 minutes. A pH adjuster-oil or fat mixed starch without a heat-treatment (sample 5) was obtained by this procedure.

Comparative Example 5

Similar process as in Comparative Example 1 was carried out except that the heating condition was at 80 degrees C. for 10 days to obtain an oil- or fat-processed starch (sample 6).

The solubility, the flavor and the emulsifying capacity for samples 1 to 6 obtained as described above were respectively evaluated. The evaluation results are shown in Table 1. The solubility and the emulsifying capacity were respectively measured by above-described methods. Also, sensory evaluations were carried out for the flavor. Criteria for the evaluation were as follows.

(Evaluation of Flavor)

The sensory evaluations were conducted by five panelists.
O: good;
Δ: acceptable though slight oxidation odor; and
X: an oxidation odor.

was heated in a thermostatic bath at 85 degrees C. for 25 minutes, and then, in turn, was cooled in an ice bath water for 25 minutes to prepare a minced meat gel. In addition to above, the pickling liquid employed here was a mixture of: 4 g of the sample starch; 0.07 g of xanthan gum drug (commercially available from DSP GOKYO FOOD & CHEMICAL Co., Ltd.); 0.07 g of starch sodium octenyl-succinate (commercially available from National Starch and Chemical (NSC) Japan Co., Ltd.); 0.6 g of salt; and 35 g of water.

Mass (g) of drip flowed out when the obtained minced meat gel was taken out from the casing tube was measured for each of the obtained minced meat gel, and the drip rate was calculated on the basis of the following formula:

[drip rate (%)]=[mass of drip]/[mass of minced meat gel before heating]×100.

TABLE 1

| | | EXAMPLE 1 SAMPLE 1 | COMPARATIVE EXAMPLE 1 SAMPLE 2 | COMPARATIVE EXAMPLE 2 SAMPLE 3 | COMPARATIVE EXAMPLE 3 SAMPLE 4 | COMPARATIVE EXAMPLE 4 SAMPLE 5 | COMPARATIVE EXAMPLE 5 SAMPLE 6 |
|---|---|---|---|---|---|---|---|
| FORMULATION (PART BY MASS) | CROSS-LINKED TAPIOCA STARCH | 100 | 100 | 100 | 100 | 100 | 100 |
| | HIGH LINOLEIC SAFFLOWER OIL | 0.1 | 0.1 | 0 | 0.1 | 0.1 | 0.1 |
| | SODIUM CARBONATE | 0.1 | 0 | 0.1 | 0.1 | 0.1 | 0 |
| HEATING CONDITIONS | | 70° C., 14 DAYS | 70° C., 14 DAYS | 70° C., 14 DAYS | 70° C., 14 DAYS | NO HEATING | 80° C., 10 DAYS |
| EVALUATION RESULTS | SOLUBILITY (MASS %) | 10.1 | 58.3 | 24 | 70.9 | 17 | 97.6 |
| | FLAVOR | O | X | O | X | O | X |
| | EMULSIFYING CAPACITY (%) | 71 | 100 | 2 | 75 | 0 | 100 |

According to Table 1, the sample 1, which was obtained by the heat-treatment after adding the pH adjuster exhibited lower solubility and the oxidation odor unique to the oil or fat was suppressed, and on the other hand, the sample 2 and the sample 6, which contain no pH adjuster, exhibited higher solubility and noticeable oxidation odor unique to the oil or fat. Also, the sample 4, which was obtained by adding the pH adjuster after the preparation of the oil- or fat-processed starch, also similarly exhibited noticeable oxidation odor. On the other hand, the sample 3, which contained no oil or fat, and the sample 5, which was not heated, exhibited lower emulsifying capacity and thus were not processed with oil or fat.

In addition to above, the viscosity of 40% by mass slurry of the sample 1 was 128 cP, which was lower than the sample 6, which was, namely, the oil- or fat-processed starch obtained according to the method described in Patent Document 5.

Example 2

In the present Example, the effect of the oil- or fat-processed starch for improving quality of the edible meat was evaluated by minced meat gel test for the samples 1 to 6 obtained in Example 1 and Comparative Examples 1 to 5.

40 g of a pickling liquid was well mixed in 40 g of a minced pig loin meat, and was stuffed in a casing tube, and Further, the minced meat gel was cut in 1.5 cm-thick, and "gel hardness" (g) was measured by employing a texture analyzer (commercially available from Stable Micro Systems Co., Ltd.). The gel hardness (g) was defined as the maximum stress when it was compressed to 50% by employing a circular aluminum plunger having diameter of 25 mm at test speed of 1 mm/s.

The references of the sensory evaluation were as follows. The sensory evaluations were conducted by five panelists.
(Springiness)
O: higher springiness
Δ: normal
X: no springiness
(Cohesiveness)
O: higher cohesiveness
Δ: normal
X: no cohesiveness
(Flexibility)
O: flexible
Δ: normal
X: not flexible
(Flavor)
O: good
Δ: acceptable though slight oxidation odor; and
X: an oxidation odor.

The evaluation results of the minced meat gels obtained by using the starches of the samples 1 to 6 are shown in Table 2.

TABLE 2

|  |  | SAMPLE 1 | SAMPLE 2 | SAMPLE 3 | SAMPLE 4 | SAMPLE 5 | SAMPLE 6 |
|---|---|---|---|---|---|---|---|
| DRIP RATE (%) | | 1.6 | 4.1 | 4.3 | 2.4 | 1.8 | 12.8 |
| GEL HARDNESS (g) | | 1380 | 1070 | 1100 | 930 | 920 | 510 |
| SENSORY | SPRINGINESS | ○ | X | Δ | X | Δ | X |
| EVALUATIONS | COHESIVENESS | ○ | X | Δ | Δ | Δ | X |
|  | FLEXIBILITY | ○ | X | X | X | X | X |
|  | FLAVOR | ○ | X | ○ | X | ○ | X |

According to Table 2, good minced meat gel was created in the sample 1. More specifically, hard and springy minced meat gel with smaller amount of the drip and improved flavor was created, and thus enhanced effect for improving quality of meat was obtained. On the other hand, the sample 2 and the sample 6, which contain no pH adjuster, exhibited inferior flavors, and larger amount of the drip was found as compared with the sample 1. Further, the sample 4, in which only the pH adjuster was mixed after the preparation of the oil- or fat-processed starch, exhibited similarly exhibited inferior flavor, and the oxidation odor was noticeable. On the other hand, the sample 3, which contained no oil or fat, and the sample 5, which was not heated, exhibited no effect for improving quality of the meat, and were finished softly.

Example 3

In the present Example, the adding quantity of the pH adjuster in the production of the oil- or fat-processed starch was studied.

More specifically, starches processed with oil or fat were produced similarly as in Example 1, with different adding quantities of sodium carbonate as shown in Table 3. Also, pH of 10% by mass-concentration slurry of the mixture obtained in the above-mentioned first step is shown in the table. The solubility and the emulsifying capacity were measured, and sensory evaluations of the flavor were conducted for the respective samples.

in flavor. On the other hand, larger amount of sodium carbonate provided excessively lower emulsifying capacity and excessively higher solubility, and caused abnormal flavor unique to salts.

Example 4

Starches of the samples 7 to 14 obtained in Example 3 were employed to conduct minced meat gel tests according to the method described in Example 2, and the drip in the heating, the effect for improving quality of the edible meat-processed products, and the flavor were evaluated. The drip rate and the gel hardness employing the sample before heating were determined as 100%, and "relative drip rate" and "relative gel hardness" were calculated by the following formulae. The results are shown in Table 4.

[relative drip rate (%)]=[drip rate of sample after heating]/[drip rate of sample before heating]×100; and

[relative gel hardness (%)]=[gel hardness of sample after heating]/[gel hardness of sample before heating]×100.

TABLE 3

|  |  | SAMPLE 7 | SAMPLE 8 | SAMPLE 9 | SAMPLE 10 | SAMPLE 11 | SAMPLE 12 | SAMPLE 13 | SAMPLE 14 |
|---|---|---|---|---|---|---|---|---|---|
| FORMULATION | STARCH | 100 | 100 | 100 | 100 | 100 | 100 | 100 | 100 |
| (PART BY MASS) | HIGH LINOLEIC SAFFLOWER OIL | 0.1 | 0.1 | 0.1 | 0.1 | 0.1 | 0.1 | 0.1 | 0.1 |
|  | SODIUM CARBONATE | 0.01 | 0.03 | 0.1 | 1 | 3 | 5 | 10 | 0.001 |
| EVALUATION RESULTS | SOLUBILITY (MASS %) | 30.5 | 18.5 | 10.1 | 25.8 | 97.8 | 95.7 | 87.3 | 54.8 |
|  | FLAVOR | Δ | Δ | ○ | ○ | ○ | Δ | X | X |
|  | EMULSIFYING CAPACITY (%) | 72 | 74 | 71 | 60 | 22 | 5 | 5 | 72 |
|  | pH* | 6.7 | 7.6 | 8.8 | 10.3 | 10.8 | 10.9 | 11 | 5.4 |

*THE MIXTURE OBTAINED IN THE FIRST STEP WAS EMPLOYED TO PREPARE STARCH SLURRY OF 10 MASS % CONCENTRATION, AND pH OF THE SLURRY WAS MEASURED ACCORDING TO GLASS ELECTRODE METHOD.

According to Table 3, smaller amount of sodium carbonate provided increased solubility, and caused oxidation odor

TABLE 4

|  |  | SAMPLE 7 | SAMPLE 8 | SAMPLE 9 | SAMPLE 10 | SAMPLE 11 | SAMPLE 12 | SAMPLE 13 | SAMPLE 14 |
|---|---|---|---|---|---|---|---|---|---|
| RELATIVE DRIP RATE (%) | | 123 | 155 | 154 | 73 | 316 | 1198 | 1198 | 394 |
| RELATIVE GEL HARDNESS (%) | | 134 | 144 | 150 | 116 | 67 | 50 | 58 | 131 |
| SENSORY | SPRINGINESS | ○ | ○ | ○ | ○ | X | X | Δ | X |
| EVALUATIONS | COHESIVENESS | ○ | ○ | ○ | ○ | X | X | Δ | X |
|  | FLEXIBILITY | Δ | ○ | ○ | ○ | X | X | Δ | X |
|  | FLAVOR | ○ | ○ | ○ | ○ | ○ | ○ | ○ | X |
| REMARKS | | | | | | | | | OXIDATION |

TABLE 4-continued

| | SAMPLE 7 | SAMPLE 8 | SAMPLE 9 | SAMPLE 10 | SAMPLE 11 | SAMPLE 12 | SAMPLE 13 | SAMPLE 14 |
|---|---|---|---|---|---|---|---|---|
| | | | | | | | | ODOR |

According to Table 4, smaller amount of sodium carbonate provided deteriorated effect for improving the quality. On the other hand, larger amount of sodium carbonate provided higher drip and softening, and caused abnormal flavor unique to salts.

Example 5

In the present Example, starches processed with oil or fat were produced according to the method described in Example 1 with different adding quantities of the edible oil or fat. The results of the measured solubility and emulsifying capacity and the results of the sensory evaluations of the flavor for the respective samples are shown in Table 5. Further, the obtained starches were employed to conduct minced meat gel tests according to the method described in Example 4, and the drip in the heating, the effect for improving quality of the edible meat-processed products, and the flavor were evaluated. The results are shown in Table 6.

deteriorated. On the other hand, excessively smaller amount of the edible oil or fat provided insufficient effect for improving the eating-texture.

Example 6

In the present Example, starches processed with oil or fat were produced according to the method described in Example 1 with the edible oils and fats having different iodine values according to the formulation shown in Table 7. The solubility and the emulsifying capacity were measured, and evaluations of the flavor were conducted for the respective samples. Further, the obtained starches were employed to conduct minced meat gel tests according to the method described in Example 4, and the effect for improving quality of the edible meat-processed products, and the flavor were evaluated. The results are shown in Table 8.

According to Table 7 and Table 8, sufficient effects for improving the quality of the meat were achieved in all of the

TABLE 5

| | | SAMPLE 15 | SAMPLE 16 | SAMPLE 17 | SAMPLE 18 | SAMPLE 19 | SAMPLE 20 | SAMPLE 21 | SAMPLE 22 |
|---|---|---|---|---|---|---|---|---|---|
| FORMULATION (PART BY MASS) | STARCH | 100 | 100 | 100 | 100 | 100 | 100 | 100 | 100 |
| | HIGH LINOLEIC SAFFLOWER OIL | 0.001 | 0.01 | 0.03 | 0.1 | 1 | 3 | 5 | 10 |
| | SODIUM CARBONATE | 0.1 | 0.1 | 0.1 | 0.1 | 0.1 | 01 | 0.1 | 0.1 |
| EVALUATION RESULTS | SOLUBILITY (MASS %) | 15.1 | 18.7 | 16.5 | 10.1 | 36.1 | 77 | 84.8 | 66.5 |
| | FLAVOR | ○ | ○ | ○ | ○ | Δ | X | X | X |
| | EMULSIFYING CAPACITY (%) | 0 | 60 | 65 | 71 | 60 | 100 | 100 | 100 |

TABLE 6

| | | SAMPLE 15 | SAMPLE 16 | SAMPLE 17 | SAMPLE 18 | SAMPLE 19 | SAMPLE 20 | SAMPLE 21 | SAMPLE 22 |
|---|---|---|---|---|---|---|---|---|---|
| RELATIVE DRIP RATE (%) | | 179 | 227 | 177 | 154 | 181 | 343 | 127 | 61 |
| RELATIVE GEL HARDNESS (%) | | 86 | 120 | 116 | 150 | 143 | 109 | 110 | 125 |
| SENSORY EVALUATIONS | SPRINGINESS | X | Δ | ○ | ○ | ○ | Δ | X | X |
| | COHESIVENESS | X | Δ | ○ | ○ | Δ | X | X | X |
| | FLEXIBILITY | Δ | Δ | ○ | ○ | Δ | X | X | X |
| | FLAVOR | ○ | ○ | ○ | ○ | ○ | Δ | X | X |
| REMARKS | | | | | | | SLIGHT OXIDATION ODOR | OXIDATION ODOR | OXIDATION ODOR |

According to Table 5 and Table 6, excessively larger amount of the edible oil or fat caused increased solubility even though the pH adjuster was added, and the flavor was edible oils and fats, and were particularly significant in the oil or fat having iodine value of 150.

TABLE 7

| | | SAMPLE 23 | SAMPLE 24 | SAMPLE 25 | SAMPLE 26 |
|---|---|---|---|---|---|
| FORMULATION | STARCH | 100 | 100 | 100 | 100 |

TABLE 7-continued

|  |  |  | SAMPLE 23 | SAMPLE 24 | SAMPLE 25 | SAMPLE 26 |
|---|---|---|---|---|---|---|
| (PART BY MASS) | HIGH LINOLEIC SAFFLOWER OIL | IODINE VALUE 150 | 0.1 |  |  |  |
|  | SOYBEAN OIL | IODINE VALUE 133 |  | 0.1 |  |  |
|  | CORN OIL | IODINE VALUE 120 |  |  | 0.1 |  |
|  | CANOLA OIL | IODINE VALUE 110 |  |  |  | 0.1 |
|  | SODIUM CARBONATE |  | 0.1 | 0.1 | 0.1 | 0.1 |
| EVALUATION RESULTS | SOLUBILITY (MASS %) |  | 13.8 | 12.6 | 12.5 | 12.6 |
|  | FLAVOR |  | ○ | ○ | ○ | ○ |
|  | EMULSIFYING CAPACITY (%) |  | 69 | 60 | 60 | 60 |

TABLE 8

|  |  | SAMPLE 23 | SAMPLE 24 | SAMPLE 25 | SAMPLE 26 |
|---|---|---|---|---|---|
| RELATIVE GEL HARDNESS (%) |  | 134 | 111 | 110 | 114 |
| SENSORY EVALUATIONS | SPRINGINESS | ○ | ○ | ○ | ○ |
|  | COHESIVENESS | ○ | Δ | Δ | Δ |
|  | FLEXIBILITY | ○ | ○ | ○ | ○ |
|  | FLAVOR | ○ | ○ | ○ | ○ |

Example 7

In the present Example, starches processed with oil or fat were prepared by using various types of the pH adjusters. More specifically, mixtures of the starches, the oils and fats and various types of the pH adjusters were prepared according to the formulation of Table 9, and then the heating temperature and the heating time described in Example 1 were employed to produce starches processed with oil or fat. Also, pH (25 degrees C.) of 1% by mass aqueous solution of the various types of the pH adjusters were also shown in the table. The solubility and the emulsifying capacity were measured, and evaluations of the flavor were conducted for the respective samples. Further, the obtained starches processed with oil or fat were employed to conduct minced meat gel tests according to the method described in Example 4, and the effect for improving quality of the edible meat-processed products, and the flavor were evaluated. The results are shown in Table 10.

TABLE 9

|  |  | pH* | SAMPLE 27 | SAMPLE 28 | SAMPLE 29 | SAMPLE 30 | SAMPLE 31 | SAMPLE 32 | SAMPLE 33 |
|---|---|---|---|---|---|---|---|---|---|
| FORMULATION (PART BY MASS) | STARCH |  | 100 | 100 | 100 | 100 | 100 | 100 | 100 |
|  | HIGH LINOLEIC SAFFLOWER OIL |  | 0.1 | 0.1 | 01 | 0.1 | 0.1 | 0.1 | 0.1 |
|  | SODIUM CARBONATE | 11.7 | 0.1 |  |  |  |  |  |  |
|  | SODIUM HYDROXIDE | 13.4 |  | 0.1 |  |  |  |  |  |
|  | POTASSIUM HYDROXIDE | 13.3 |  |  | 0.1 |  |  |  |  |
|  | SODIUM HYDROGEN CARBONATE | 8.3 |  |  |  | 0.1 |  |  |  |
|  | TRISODIUM CITRATE | 8.3 |  |  |  |  | 0.1 |  |  |
|  | SODIUM ACETATE | 8.1 |  |  |  |  |  | 0.1 |  |
|  | SODIUM LACTATE | 7.0 |  |  |  |  |  |  | 0.1 |
| EVALUATION RESULTS | SOLUBILITY (MASS %) |  | 13.8 | 13.8 | 15.3 | 14.1 | 15 | 14.7 | 16.2 |
|  | FLAVOR |  | ○ | ○ | ○ | ○ | ○ | Δ | Δ |
|  | EMULSIFYING CAPACITY (%) |  | 69 | 65 | 69 | 68 | 66 | 65 | 66 |

*pH (25° C.) OF 1 MASS % AQUEOUS SOLUTION OF pH ADGUSTERS

TABLE 10

|  | SAMPLE 27 | SAMPLE 28 | SAMPLE 29 | SAMPLE 30 | SAMPLE 31 | SAMPLE 32 | SAMPLE 33 |
|---|---|---|---|---|---|---|---|
| RELATIVE GEL HARDNESS (%) | 134 | 110 | 119 | 122 | 120 | 123 | 120 |
| SENSORY EVALUATIONS — SPRINGINESS | ○ | ○ | ○ | ○ | ○ | ○ | ○ |
| COHESIVENESS | ○ | ○ | ○ | ○ | ○ | ○ | ○ |
| FLEXIBILITY | ○ | ○ | ○ | ○ | ○ | ○ | ○ |
| FLAVOR | ○ | ○ | ○ | ○ | ○ | ○ | ○ |

According to Table 9 and Table 10, the flavor of the minced meat gel was improved when a salt exhibiting pH of 1% by mass aqueous solution thereof of equal to or larger than 7 was added, though the results did not considerably depend upon the type of the pH adjusters.

Also, in the case of acetates, acetic acid-odor unique to acetate was slightly sensed.

Example 8

Starches processed with oil or fat were prepared by employing starches shown in Table 11, in place of the tapioca cross-linking starch employed in Example 1 (TP-1). The obtained starches processed with oil or fat were employed to conduct minced meat gel tests according to the method described in Example 4, and the effect for improving quality of the edible meat-processed products, and the flavor were evaluated. Also, measurements for the degree of swelling of the oil- or fat-processed starch were conducted. The results are shown in Table 11.

preferable. On the other hand, in terms of the types of the starch, tapioca starch and potato starch were preferable.

Example 9

In the present Example, the heating conditions in the production of the oil- or fat-processed starch was studied. More specifically, the mixtures were obtained by employing the conditions of Example 1, and were heated by employing the conditions shown in Table 12. Further, the obtained starches processed with oil or fat were employed to conduct minced meat gel tests according to the method described in Example 4, and the drip in the heating, the effect for improving quality of the edible meat-processed products, and the flavor were evaluated. The results are shown in Table 13.

TABLE 11

| | | SAMPLE 34 | SAMPLE 35 | SAMPLE 36 | SAMPLE 37 |
|---|---|---|---|---|---|
| TYPES OF STARCH | | CROSS LINKING TAPIOCA STARCH PHOSPHATE (TP-1) | CROSS LINKING TAPIOCA STARCH PHOSPHATE (TP-4) | LIGHT ACETYLATED TAPIOCA STARCH (EAT-2) | HIGH ACETYLATED TAPIOCA STARCH (A-700) |
| EVALUATION RESULTS OF STARCH SAMPLES | DEGREE OF SWELLING | 18.4 | 10.0 | 33.3 | 38.3 |
| | SOLUBILITY (MASS %) | 13.8 | 10.6 | 32.5 | 33.1 |
| | FLAVOR | ○ | ○ | ○ | ○ |
| | EMULSIFYING CAPACITY (%) | 71 | 67 | 54 | 60 |
| EVALUATION RESULTS OF MINCED MEAT GEL | RELATIVE GEL HARDNESS (%) | 134 | 137 | 109 | 116 |
| | SENSORY EVALUATIONS — COHESIVENESS | ○ | Δ | Δ | Δ |
| | FLEXIBILITY | ○ | ○ | ○ | ○ |
| | FLAVOR | ○ | ○ | ○ | ○ |

| | | SAMPLE 38 | SAMPLE 39 | SAMPLE 40 | SAMPLE 41 |
|---|---|---|---|---|---|
| TYPES OF STARCH | | CORN STARCH | WAXY CORN STARCH | HIGH AMYLOSE CORN STARCH | POTATO STARCH |
| EVALUATION RESULTS OF STARCH SAMPLES | DEGREE OF SWELLING | 13 | 23.7 | 4.97 | 20.5 |
| | SOLUBILITY (MASS %) | 25 | 25.8 | 9.2 | 10.2 |
| | FLAVOR | ○ | ○ | ○ | ○ |
| | EMULSIFYING CAPACITY (%) | 60 | 69 | 64 | 65 |
| EVALUATION RESULTS OF MINCED MEAT GEL | RELATIVE GEL HARDNESS (%) | 110 | 112 | 91 | 112 |
| | SENSORY EVALUATIONS — COHESIVENESS | Δ | Δ | X | Δ |
| | FLEXIBILITY | Δ | Δ | X | ○ |
| | FLAVOR | ○ | ○ | ○ | ○ |

According to Table 11, in terms of the characteristics of starch, swelling depression-starch such as cross linking starch phosphate exhibiting lower degree of swelling was

TABLE 12

|  |  | SAMPLE 42 | SAMPLE 43 | SAMPLE 44 | SAMPLE 45 | SAMPLE 46 |
|---|---|---|---|---|---|---|
| FORMULATION (PART BY MASS) | STARCH | 100 | 100 | 100 | 100 | 100 |
|  | HIGH LINOLEIC SAFFLOWER OIL | 0.1 | 0.1 | 0.1 | 0.1 | 0.1 |
|  | SODIUM CARBONATE | 0.1 | 0.1 | 0.1 | 0.1 | 0.1 |
| HEATING CONDITIONS | HEATING TEMPERATURE | 50° C. | 70° C. | 100° C. | 110° C. | 115° C. |
|  | HEATING PERIOD | 20 DAYS | 14 DAYS | 9 HOURS | 8 HOURS | 5 HOURS |
| EVALUATION RESULTS | SOLUBILITY (MASS %) | 21.1 | 10.1 | 13.8 | 24.6 | 26.3 |
|  | FLAVOR | ○ | ○ | ○ | Δ | Δ |
|  | EMULSIFYING CAPACITY (%) | 80 | 71 | 71 | 75 | 81 |

TABLE 13

|  |  | SAMPLE 42 | SAMPLE 43 | SAMPLE 44 | SAMPLE 45 | SAMPLE 46 |
|---|---|---|---|---|---|---|
| RELATIVE DRIP RATE (%) | | 102 | 154 | 120 | 75 | 109 |
| RELATIVE GEL HARDNESS (%) | | 117 | 150 | 111 | 150 | 101 |
| SENSORY EVALUATIONS | SPRINGINESS | ○ | ○ | ○ | ○ | Δ |
|  | COHESIVENESS | ○ | ○ | ○ | ○ | ○ |
|  | FLEXIBILITY | ○ | ○ | ○ | ○ | ○ |
|  | FLAVOR | ○ | ○ | ○ | ○ | Δ |

According to Table 12 and Table 13, the heating conditions at 50 degrees C. to 115 degrees C. for 5 hours to 20 days allowed producing the oil- or fat-processed starch having preferable solubility and emulsifying capacity.

Example 10

An oil- or fat-processed starch was obtained according to Example 1, except that glycerol fatty acid ester (Poem DO-100V; commercially available from Riken Vitamin Inc.) was employed in place of the high linoleic safflower edible oil or fat (sample 47). The production conditions and the evaluation results of the obtained starches are shown in Table 14. Also, the obtained starches were employed to conduct minced meat gel tests according to the method described in Example 4, and the drip in the heating, the effect for improving quality of the edible meat-processed products, and the flavor were evaluated. The results are shown in Table 15.

TABLE 14

|  |  | SAMPLE 1 | SAMPLE 47 |
|---|---|---|---|
| FORMULATION (PART BY MASS) | STARCH | 100 | 100 |
|  | HIGH LINOLEIC SAFFLOWER OIL | 0.1 | 0 |
|  | GLYCEROL FATTY ACID ESTER | 0 | 0.1 |
|  | SODIUM CARBONATE | 0.1 | 0.1 |
| HEATING CONDITIONS | HEATING TEMPERATURE | 70° C. | 70° C. |
|  | HEATING PERIOD | 14 DAYS | 14 DAYS |
| EVALUATION RESULTS | SOLUBILITY (MASS %) | 10.1 | 21.6 |
|  | FLAVOR | ○ | ○ |
|  | EMULSIFYING CAPACITY (%) | 71 | 70 |

TABLE 15

|  |  | SAMPLE 1 | SAMPLE 47 |
|---|---|---|---|
| RELATIVE DRIP RATE (%) | | 154 | 85 |
| RELATIVE GEL HARDNESS (%) | | 150 | 141 |
| SENSORY EVALUATIONS | SPRINGINESS | ○ | ○ |
|  | COHESIVENESS | ○ | Δ |
|  | FLEXIBILITY | ○ | Δ |
|  | FLAVOR | ○ | ○ |

According to Table 14 and Table 15, in the case of employing glycerol fatty acid ester that is an edible oil- or fat-related substance, the oil- or fat-processed starch having specific solubility and emulsifying capacity was able to be obtained, similarly as in the case of employing the oil or fat.

Example 11

Example of Trial Manufacture of Hamburg Steak

A hamburg steak was manufactured by employing the oil- or fat-processed starch of the sample 10 produced in Example 3 according to the following recipes. Another hamburg steak was also simultaneously manufactured as a control by employing a mixture of the sample 2 produced in the section of Example 1 containing 1% by mass of sodium carbonate, and was evaluated.

(Manufacture Method of Hamburg Steak)

Ingredients mixed according to the recipe shown in Table 16 were formed in a straw bag shape, and was heated in an oven at 200 degrees C. for 7 minutes to manufacture the hamburg steak.

TABLE 16

RECIPE OF HAMBURG STEAK

| INGREDIENTS | BLENDING RATIO (MASS %) |
|---|---|
| MINCED BEEF AND PORK | 49% |
| ONION (CROSSWISE-SLICED) | 15% |
| VEGETABLE OIL | 12% |

TABLE 16-continued

RECIPE OF HAMBURG STEAK

| INGREDIENTS | BLENDING RATIO (MASS %) |
|---|---|
| BREADCRUMB | 7% |
| STARCH | 5% |
| SALT | 0.7% |
| SUGAR | 1% |
| Na GLUTAMATE | 0.3% |
| PEPPER | 0.2% |
| WATER | 9.8% |
| TOTAL | 100% |

As a result, the hamburg steak containing the oil- or fat-processed starch of the sample 10 blended therein exhibited smaller amount of the drip in the thermal cooking and was finished in the springy eating-texture, as compared with the hamburg steak of the control.

Example 12

Example of Trial Manufacture of Fried Chicken (Karaage)

A pickling liquid was produced according to the recipe of Table 17 by employing the oil- or fat-processed starch of Example 1 (sample 1), and 60 parts of the pickling liquid was added to 100 parts of chicken breast meat, and massage was conducted for the meat by employing a tumbler for one hour. Thereafter, 100 parts of such chicken was coated with 120 parts of the batter, and was heated at 170 degrees C. for 6 minutes to manufacture the fried chicken. The production yield of these fried chickens and the results of the sensory evaluations are shown in Table 18. Here, in Table 18, the heat cooking production yield was obtained by the following method:

[heat cooking production yield (%)]=[weight of meat after heat cooking]/[weight of meat before heat cooking]×100.

TABLE 17

| INGREDIENTS | BLENDING RATIO (MASS %) |
|---|---|
| STARCH | 10% |
| SUPERFINE SUGAR | 2% |
| SALT | 2% |
| Na GLUTAMATE | 0.7% |
| PEPPER | 0.1% |
| ICED WATER | 85.2% |
| TOTAL | 100% |

TABLE 18

| | EXAMPLE 1 | NON PROCESSED |
|---|---|---|
| HEAT COOKING PRODUCTION YIELD | 90.0% | 61.8% |
| SENSORY EVALUATIONS | JUICY | DRIED |

Example 13

Example of Trial Manufacture of Steamed Fish Paste (Kamaboko)

Manufacture method of the steamed fish paste by employing the starches processed with oil or fat of sample 1 and sample 2 or tapioca cross-linking starch (TP-1, commercially available from J-OIL MILLS, Inc.) will be described below. 2 g of salt was added to 100 g of frozen minced fish meat (FA grade) of Alaska pollack, and was well kneaded, and 85 g of the starch suspension (starch 5 g, water 80 g) was added and was well kneaded again to obtain minced fish meat paste. This minced fish meat paste was charged in a casing tube of a diameter of 3 cm, and was allowed to stand still at 15 degrees C. for 14 hours, and then was heated at 90 degrees C. for 20 minutes, and was cooled with running water for 20 minutes to obtain the steamed fish paste.

(Method for Evaluating Steamed Fish Paste)

The steamed fish paste was cut into 2.5 cm-thick slice, and "breaking strength" (g) and "breaking depression" (cm) were measured by employing a texture analyzer (commercially available from Stable Micro Systems Co., Ltd.), and "jelly strength" (g·cm) was calculated on the basis of the following formula. A spherical plunger of a diameter of 5 mm was employed to conduct the measurements, in which the slice of the steamed fish paste was compressed at test speed of 1 mm/s, and the stress (g) at the breaking and the distance (cm) of the plunger moved until the slice was broken presented the breaking strength (g) and the breaking depression (cm), respectively.

[jelly strength (g·cm)]=[breaking strength (g)]× [breaking depression (cm)].

The evaluation results for the steamed fish pastes by employing the starches processed with oil or fat of sample 1 and sample 2 or tapioca cross-linking starch (TP-1) are shown in Table 19.

TABLE 19

| EMPLOYED STARCHES | SAMPLE 1 | SAMPLE 2 | CROSS-LINKED TAPIOCA STARCH (TP-1) |
|---|---|---|---|
| JELLY STRENGTH (g · cm) | 239 | 133 | 150 |
| SENSORY EVALUATIONS | HARD, HIGHLY SPRINGY | SOFT, LESS SPRINGY, SLIGHTLY RELEASING WATER | SOFT, LESS SPRINGY |

According to Table 19, the steamed fish paste employing the sample 1 achieved favorable results. More specifically, the steamed fish paste exhibited higher jelly strength, hard eating-texture and higher springiness, and thus better reforming effect was obtained. On the other hand, the steamed fish pastes employing the sample 2 exhibiting higher solubility and the tapioca cross-linking starch that is not the oil- or fat-processed starch presented lower gel strength and deteriorated eating-texture, as compared with the steamed fish paste employing the sample 1.

Example 14

An oil- or fat-processed starch was obtained according to Example 1, except that a light acetylated tapioca starch "TAC-30" (commercially available from J-OIL MILLS, Inc.) was employed in place of the tapioca cross-linking starch (TP-1) and the amount of the 25% sodium carbonate aqueous solution was 1.2 part (sodium carbonate equivalent: 0.3 part) in place of 0.4 part (sodium carbonate equivalent:

0.1 part) (sample 48). The solubility and the emulsifying capacity of the sample 48 were 18.0% by mass and 70%, respectively.

Example 15

Example of Trial Manufacture of Bread

Raw materials were blended according to the ratio (% by mass) shown in Table 20, and breads were obtained by the method described in Table 21.

TABLE 20

|  | HARD FLOUR | LIGHT ACETYLATED TAPIOCA STARCH (TAC-30) | SAMPLE 48 |
|---|---|---|---|
| <SPONGE DOUGH RECIPE> | | | |
| HARD FLOUR | 70 | 70 | 70 |
| GLYCEROL FATTY ACID ESTER | 0.3 | 0.3 | 0 |
| YEAST FOOD | 0.1 | 0.1 | 0.1 |
| FRESH YEAST | 2.2 | 2.2 | 2.2 |
| WATER | 40 | 40 | 40 |
| <MAIN KNEADED DOUGH RECIPE> | | | |
| HARD FLOUR | 30 | 0 | 0 |
| STARCH | 0 | 24.6 | 24.6 |
| WHEAT PROTEIN | 0 | 5.4 | 5.4 |
| SUPERFINE SUGAR | 6 | 6 | 6 |
| SALT | 2 | 2 | 2 |
| SKIM MILK | 2 | 2 | 2 |
| MARGARINE (COMMERCIALLY AVAILABLE FROM J-OIL MILLS, INC.) | 6 | 6 | 6 |
| WATER | 25 | 25 | 25 |
| TOTAL | 183.6 | 183.6 | 183.3 |

TABLE 21

| MIXING OF SPONGE DOUGH | 3 MIN. AT LOWER SPEED; 1 MIN. AT INTERMEDIATE SPEED |
|---|---|
| KNEADING TEMPERATURE | 24° C. |
| FERMENTATION | 4 HOURS, 27° C. |
| MAIN KNEADING | 3 MIN. AT LOWER SPEED; 2 MIN. AT INTERMEDIATE SPEED; 1 MIN. AT HIGHER SPEED, (ADDING OIL AND FAT), 2 MIN. AT LOWER SPEED; 2 MIN. AT INTERMEDIATE SPEED; 4 MIN. AT HIGHER SPEED |
| KNEADING TEMPERATURE | 28° C. |
| FLOOR TIME | 30 MINUTES |
| DIVISION | 220 g × 16 |
| BENCH TIME | 20 MINUTES |
| FORMING | SINGLE SHOT THROUGH MOULDER, THREE LOAFS, RECTANGULAR |
| PROOFER | 38° C., 80%, 50 MIN. |
| BAKING | UPPER HEAT: 190° C., LOWER HEAT: 220° C., 50 MIN. |

The evaluation results of a bread, in which the hard flour of the main kneaded dough is not replaced, a bread, in which the hard flour is replaced with wheat protein and light acetylated tapioca starch (TAC-30) or the sample 48, are shown in Table 22.

In Table 22, the references of the sensory evaluation were as follows.

(Clear-cut Feel)

◯: good clear-cut feel

Δ: normal

X: bad clear-cut feel (Springiness)

◯: chewy and springy

Δ: normal

X: not chewy and springy

TABLE 22

|  |  | HARD FLOUR | LIGHT ACETYLATED TAPIOCA STARCH (TAC-30) | SAMPLE 48 |
|---|---|---|---|---|
| WORKABILITY | | ADEQUATE | EXCESSIVELY LARGER AMOUNT OF WATER WAS ADDED TO PROVIDE GOOEY DOUGH, LESS WORKABLE. | ADEQUATE |
| SENSORY EVALUATIONS | CLEAR-CUT FEEL | ◯ | X | ◯ |
|  | SPRINGINESS | X | ◯ | ◯ |

According to Table 22, the bread employing the light acetylated tapioca starch exhibited rebounding and springy eating-texture, but the eating feel was deteriorated, and the bread manufacture workability was also deteriorated. On the other hand, the use of the tapioca oil- or fat-processed starch of the sample 48 allowed increasing the addition of water to provide rebounding and springy eating-texture without deteriorating the eating feel, thereby obtaining enhanced modifying effect. Also, while the recipes including the hard flour and the light acetylated tapioca starch (TAC-30) required the addition of an emulsifying agent (glycerol fatty acid ester) for the purpose of improving the processibility, the recipe including the sample 48 allowed achieving sufficient processibility without adding an emulsifying agent.

Example 16

An oil- or fat-processed starch was obtained according to Example 8, except that the amount of the 25% sodium carbonate aqueous solution was 4 parts (sodium carbonate equivalent: 1 part) in place of 0.4 part in the sample 37 (sodium carbonate equivalent: 0.1 part) (sample 49). The solubility and the emulsifying capacity of the sample 49 were 33.6% by mass and 80%, respectively.

Example 17

Example of Trial Manufacture of Chilled Noodle

Raw materials according to the recipe (% by mass) shown in Table 23 were kneaded to produce a dough, and the dough was cut by using angled cutting blade No. 10 into the noodles having the thickness of 2.4 mm, and the obtained noodles were boiled in a boiling bath for 8 minutes, and then the boiled noodles were cooled in cold water, and then, the noodles were refrigerated for overnight to obtain chilled noodles.

TABLE 23

|  | HIGH ACETYLATED TAPIOCA STARCH (A-700) | SAMPLE 49 |
|---|---|---|
| ALL PURPOSE FLOUR | 70 | |
| STARCH | 30 | |
| GLUTEN | 2.5 | |
| SALT | 4 | |
| WATER | 40 | 43 |

While addition of water was increased to manufacture the chilled noodles in the recipe including the sample 49 as compared with the recipe including high acetylated tapioca starch (A-700), the chilled noodles having equivalent appearance/eating-texture/taste was able to be produced as compared with the recipe including high acetylated tapioca starch (A-700). On the other hand, in the case of the recipe including the highly-acetylated tapioca starch (A-700), when the same amount of water as employed in the recipe including the sample 49 was added to the dough and was kneaded, the produced raw noodle dough was loose due to excessively larger amount of water, and thus the surface of the noodle was coarse, and the eating-texture of the produced chilled noodle was not preferable. More specifically, the use of the sample 49 allowed the production of noodles having enhanced appearance/eating-texture/taste even if larger amount of water was added as compared with the ordinary recipe, leading to improvement in the production yield.

Also, the conventional oil- or fat-processed starch exhibits the oxidation odor of the oil or fat, and thus the noodles employing the conventional oil- or fat-processed starch exhibits bad flavor. On the other hand, the sample 49 of the present invention did not release an oxidation odor, and the flavor of the noodles employing thereof was not deteriorated.

The present patent application claims priority on the basis of Japanese Patent Application No. 2011-123513 filed 1 Jun. 2011, whole contents of which are hereby incorporated by reference.

The invention claimed is:

1. A method for producing an oil- or fat-processed starch, satisfying the following conditions (A) and (B), including:
combining the followings to prepare a mixture:
a raw starch,
an edible oil or fat and/or an edible oil- or fat-related substance at an amount of equal to or larger than 0.005 parts by mass and equal to or smaller than 2 parts by mass in 100 parts by mass of the raw starch, and
a pH adjuster at an amount of equal to or larger than 0.005 parts by mass and equal to or smaller than 2 parts by mass over 100 parts by mass of the raw starch, the pH adjuster being one or more selected from a group consisting of sodium hydroxide, potassium hydroxide, calcium hydroxide, magnesium hydroxide, sodium carbonate, sodium hydrogen carbonate, potassium carbonate, disodium hydrogen phosphate, sodium dihydrogen phosphate, trisodium citrate, sodium acetate, sodium lactate, disodium succinate, sodium gluconate, sodium tartrate and monosodium fumarate; and
heat-treating said mixture to make the oil- or fat-processed starch,
(A) a solubility is equal to or higher than 9.5% by mass and equal to or lower than 45% by mass, said solubility being obtained by the following procedure:
0.1 g by anhydride conversion of the oil- or fat-processed starch is dispersed in 10 mL of distilled water, and the mixture is heated in a thermostatic bath vessel at 90 degrees C. for 30 minutes, and then is cooled down to 20 degrees C. to obtain a gelatinized liquid; and
the gelatinized liquid is centrifuged to be separated; and total sugar content contained in a supernatant liquid is measured by a phenol-sulfuric acid method to obtain said solubility; and
(B) an emulsifying capacity is equal to or higher than 50% and equal to or lower than 100%, said emulsifying capacity being obtained by the following procedure:
2.5 g of the oil- or fat-processed starch is dispersed in 30 g of distilled water and 30 g of canola oil is added therein and the mixture is stirred (at 3,000 rpm for 1 minute) by a homogenizer; and
then, promptly after the stirring, 50 mL of the dispersion is transferred in a measuring cylinder of a volume of 50 mL and is left for 30 minutes, and a volume fraction of an emulsified layer is measured to obtain said emulsifying capacity.

2. The method for producing the oil- or fat-processed starch as set forth in claim 1, wherein iodine value of said edible oil or fat is equal to or higher than 100.

3. The method for producing the oil- or fat-processed starch as set forth in claim 1, wherein degree of swelling of said raw starch equal to or higher than 5 and equal to or lower than 45, said degree of swelling being obtained by the following procedure:
1 g of said raw starch is dispersed in 100 mL of water, and the dispersion is heated at 80 degrees C. in a thermostatic chamber for 30 minutes, and then is cooled down to 30 degrees C., and is centrifuged to obtain a precipitation; and
the precipitation is thermally dried (at 105 degrees C. for 4 hours), and (weight before dry)/(weight after dry) of said precipitation presents said degree of swelling.

4. The method for producing the oil- or fat-processed starch as set forth in claim 1, wherein said raw starch is one or more selected from a group consisting of: a cross-linked starch, an acetylated starch, a potato starch, a corn starch and a waxy corn starch.

5. The method for producing the oil- or fat-processed starch as set forth in claim 1, wherein pH of an aqueous solution of the pH adjuster at 1% by mass (25 degrees C.) is equal to or higher than 6.5.

6. The method for producing the oil- or fat-processed starch as set forth in claim 1, wherein said pH adjuster combined with the raw starch and the edible oil or fat and/or an edible oil- or fat-related substance is a solution in which the pH adjuster is dissolved in water of equal to or larger than 0.1 parts by mass and equal to or smaller than 10 parts by mass over 100 parts by mass of said raw starch.

7. The method for producing the oil- or fat-processed starch as set forth in claim 1, wherein said heat-treating is heating thereof at a temperature of equal to or higher than 40 degrees C. and equal to or lower than 130 degrees C. for equal to or longer than 0.5 hour and equal to or shorter than 25 days.

8. The method for producing the oil- or fat-processed starch as set forth in claim 1, wherein the pH adjuster is combined with the raw starch and the edible oil or fat and/or an edible oil- or fat-related substance so that pH of the mixture is in a range of 6.5 to 10.9.

* * * * *